June 18, 1963  R. J. WILLS  3,094,624

SCANNING MECHANISM FOR PHOTO-ELECTRIC LINE-FOLLOWING DEVICES

Filed June 30, 1961

Inventor
Robert Joseph Wills
By
Aaron R. Townsend
Attorney

United States Patent Office 3,094,624
Patented June 18, 1963

3,094,624
SCANNING MECHANISM FOR PHOTO-ELECTRIC LINE-FOLLOWING DEVICES
Robert Joseph Wills, Harlow, England, assignor to The British Oxygen Company Limited, a British company
Filed June 30, 1961, Ser. No. 121,006
Claims priority, application Great Britain July 1, 1960
2 Claims. (Cl. 250—202)

This invention relates to a scanning mechanism for photo-electric line-following devices such as are used for controlling machine operations, for example the movement of the cutting nozzle of a flame-cutting machine which is cutting plate to a shape corresponding with a line drawing, the latter being traversed by a photo-electric line-following device which scans the line drawing during operation.

Various methods of effecting the scanning function have already been proposed. For example, it is known to project a spot of light onto an outline, so that the spot is half on a dark background and half on a light background, and to detect variations of that condition of the spot by a photo-electric cell, whereby the spot is caused to follow the outline.

A moving light spot is also known, which is caused to cross and re-cross a line, and it is also known to illuminate a line drawing, and to vibrate a photo-electric cell to and fro above the line.

The present invention is concerned with an improved device for scanning a line by means of a photo-electric cell.

According to the present invention, a mechanism for scanning a line by means of a photo-electric cell comprises a body which is rotatably driven about an axis of revolution and which is drivably connected with a carrier member by a coupling which incorporates an eccentric mechanism and an antifriction bearing or bearings, the carrier member being resiliently restrained against rotation whereby the eccentric mechanism imparts a scanning motion thereto, said carrier member carrying an inclined mirror which is arranged to reflect a laterally reciprocating image of a line to be scanned onto a photo-electric cell which is not performing the scanning motion of the carrier member.

The angle of inclination of the mirror may be adjustable, whereby the amplitude of the scan can conveniently be increased or decreased by respectively decreasing or increasing the angle that the mirror face makes with the axial centre line of the assembly.

An embodiment of the invention will now be described with reference to the accompanying drawings, in which.

Figure 1:
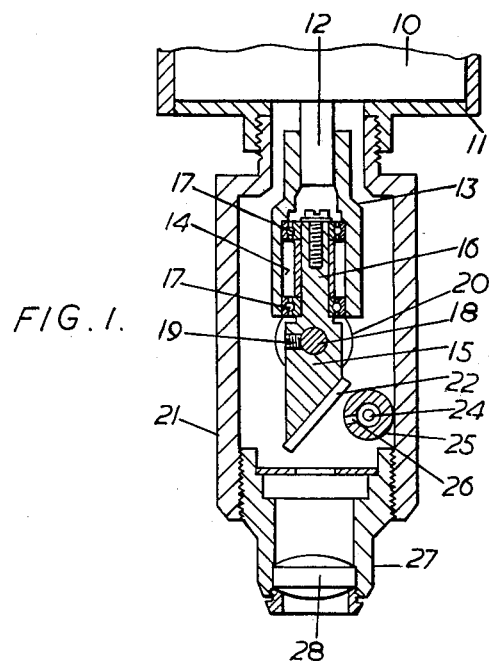
FIG. 1 is a fragmentary cross-sectional side elevation, showing the scanning mechanism portion of a photo-electric line-following device.

Referring to the drawings, an electrical motor is indicated at 10 in FIG. 1, mounted in a casing 11 with the motor drive shaft 12 depending perpendicularly. Secured to the shaft 12 is a cylindrical member 13, which as a whole is concentric on the shaft 12. The cylindrical member 13 therefore constitutes a body which is rotatably driven by the shaft 12 about an axis of revolution which is the axis of the shaft 12, but the part of the member 13 remote from the shaft 12 has a circular bore 14 the axis of which is eccentric to the axis of revolution of the member 13 as a whole.

A carrier member 15, which is of generally rectangular form, has a cylindrical projection 16 which is received by the bore 14 of the cylindrical member 13, and the projection 16 is rotatably received in the bore 14 by means of antifriction ball bearings 17. It will be seen, therefore, that the driven cylindrical member 13 is connected with the carrier member 15 by a coupling which incorporates an eccentric mechanism afforded by the eccentric bore 14, the bearings 17 and the projection 16 of the carrier member 15, and it will also be apparent that if the member 13 is rotated by the motor 10 and the carrier member 15 is resiliently restrained against rotation, then the carrier member 15 will perform an orbiting motion of amplitude depending upon the amount of the eccentricity of the axis of the bore 14 in relation to the axis of rotation of the cylindrical member 13. The carrier member 15 is restrained against rotation by a horizontal bar 18 which passes through the carrier member 15, the two being mutually secured together by a grub screw 19 seen in FIG. 1. The respective ends of the bar are secured to bushings 20 of rubber or like resilient material, which are themselves mounted in the side walls of a tubular casing part 21, which is secured to and depends from the motor casing 11 and encloses the scanning mechanism so far described. The carrier member 15 carries an inclined mirror 22 which is parallel with the bar 18, and it will therefore be seen that the mirror 22 orbits with the carrier member 15, but makes no rotational movement about a vertical axis due to the restraining action of the bar 18, while the resilient bushings 20 allow the bar 18 also to perform the orbiting motion of the carrier member 15, since the bar is disposed diametrically.

Figure 2:
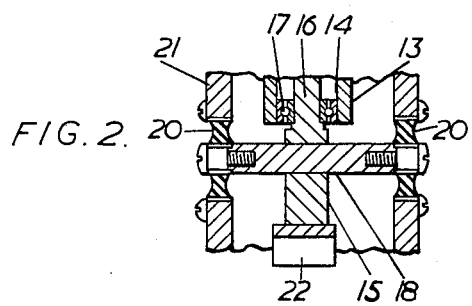
FIG. 2 is a similar view to FIG. 1, but showing a portion of FIG. 1, in a cross-sectional plane at 90° to the cross-sectional plane of FIG. 1.

An image of a line (indicated at 23 in FIG. 2) vertically below the mirror 22 is reflected thereby to a photo-transistor 24 (FIG. 1) mounted in a housing 25 secured to the inner wall of the tubular casing part 21 at an appropriate location, said housing 25 having an aperture or window 26 through which the image reaches the photo-transistor 24. The plane of the reflecting surface of the mirror 22 is parallel with the line 23 which is being scanned, with the result that the mirror reflects a laterally reciprocating image of the line 23 to the photo-transistor 24.

The line 23 is brightly illuminated for scanning, and a bottom extension 27 of the tubular casing 21 carries a lens 28 which focuses an image of the line being scanned onto the photo-transistor via the mirror 22.

The amplitude of the scan may be conveniently increased or decreased by respectively decreasing or increasing the angle that the face of the mirror makes with the vertical centre line of the assembly.

The scanning device above described follows a line drawing representing a shape to be cut from a metal plate by a flame-cutting machine, the movements of a flame-cutting torch being effected by a driven castor wheel which runs on a horizontal surface and functions as a traction wheel for the torch carriage, the castor wheel being steered to follow a path corresponding to the line drawing by being turned about a vertical axis by means of an electrical steering motor. The steering motor which steers the traction castor wheel is controlled by signals fed to it from the photo-transistor 24, and any steering turning motion of the traction castor wheel about a vertical axis is arranged to effect a corresponding turning, in the same direction, of the motor housing 11 and the tubular housing 21 secured thereto, as by a mechanical or other interconnection.

The plane of the mirror 22 is therefore always maintained parallel with the line which is being scanned, or as near as possibly parallel therewith since obviously in the case of a curved line the mirror would be parallel with a line tangential to the curved line.

If the scanning motion of the mirror is unequal to one side or the other of the lien being scanned, an error signal from the photo-transistor to the steerming motor turns the traction castor wheel and with it the scanning device in the appropriate direction to correct the error, so that the scanning device follows the line and the flame-cutting torch cuts a profile corresponding to the line drawing.

The scanning device of the present invention has advantages over known devices.

The photo-electric element is not making a scanning motion, since it is fixed to the tubular housing 21. The photo-electric element could be said to be stationary relative to the mirror 22 which is making a scanning motion, although it is not strictly true to say that the photo-electric element is stationary because the tubular housing 21 turns with the steering traction wheel and is also moving bodily as the scanning device follows a line. However, the problem of the electrical supply to the photo-electric element is greatly simplified with the present arrangement, in comparison with devices in which the element is orbiting or reciprocating, and it is also advantageous that the photo-electric element itself is not making the high-speed scanning movements which are necessary in scanning devices of this nature.

The embodiment above described refers to the steering of a driven castor wheel which moves a torch carriage, but it will be obvious to those skilled in the art that a means of resolving the tracing direction into co-ordinates could be used along with a co-ordinate drive for moving the torch carriage.

I claim:

1. In a mechanism for scanning a line by means of a photo-electric cell, the combination of a shaft, a motor driving said shaft in rotation and having a motor casing, a carrier member, an inclined mirror mounted on said carrier member, an eccentric mechanism drivably connecting said shaft with said carrier member, resilient means restraining said carrier against rotation so that an orbital scanning motion of the carrier member supporting the inclined mirror is derived from the rotation of said shaft, a tubular casing secured to said motor casing enclosing said eccentric mechanism, said carrier member and said inclined mirror, a photo-electric cell, and means supporting said photo-electric cell on the wall of said tubular casing part to receive reflected line images from said inclined mirror.

2. In a mechanism for scanning a line by means of a photo-electric cell, the combination of a shaft, a motor driving said shaft in rotation, and having a motor casing, a tubular cylindrical casing part secured to said motor casing and enclosing said shaft, a carrier member within said tubular casing part, an inclined mirror mounted on said carrier member, an eccentric mechanism drivably connecting said shaft with said carrier member, a transverse bar diametrically disposed in said tubular casing part, means securing said transverse bar to said carrier member, a resilient bushing secured to each end of said transverse bar and means mounting said resilient bushings in the side walls of said tubular casing part, said transverse bar and resilient bushings operating to restrain the carrier member against rotation so that a scanning motion of the carrier member supporting the inclined mirror is derived from the rotation of said shaft, a photo-electric cell, and means supporting said photo-electric cell on the inner wall of the tubular casing part to receive reflected line image from said inclined mirror.

References Cited in the file of this patent

UNITED STATES PATENTS

| | | |
|---|---|---|
| 2,873,381 | Lauroesch | Feb. 10, 1959 |
| 2,933,668 | Brouwer | Apr. 19, 1960 |
| 2,997,593 | King | Aug. 22, 1961 |
| 3,017,552 | Brouwer | Jan. 16, 1962 |